Figure 1:
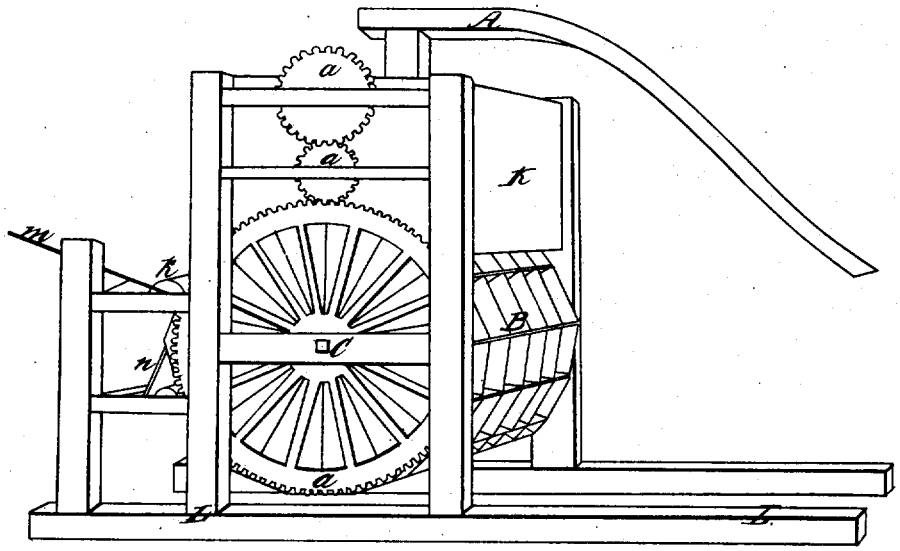
Figure 2:
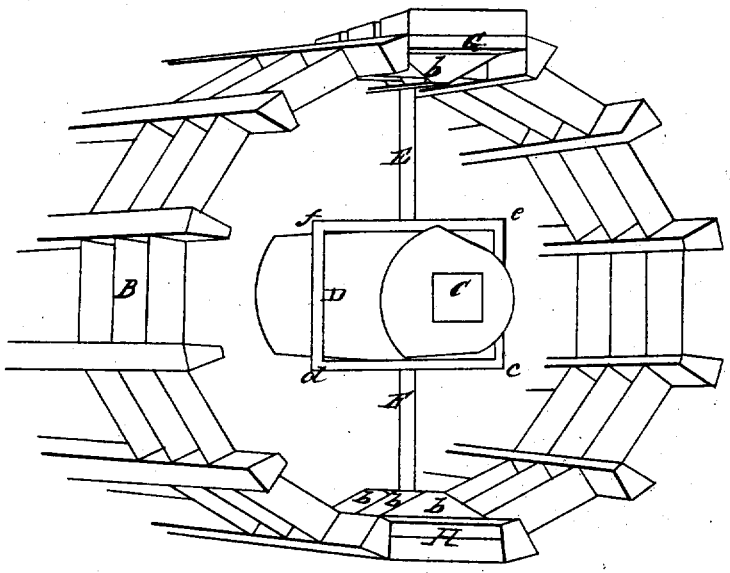

No Printed Specification Available

9826X

J. Coppuck,

Brick Machine

Patented July 1, 1836.

AM. PHOTO-LITHO. CO. N.Y. (OSBORNE'S PROCESS)

James Coppuck of Jefferson Co. Ky.
Letters Patent

The schedule referred to, in these Letters Patent, and making part of the same containing a description in the words of the said James Coppuck himself, of his improvement in the machine for moulding brick, Tile &c.

Know all men by these presents: That I James Coppuck, of the County of Jefferson, State of Kentucky, have invented a useful machine to facilitate the mode of making Brick, and that the following is a full and exact description thereof. This machine consists of a box in which are placed a system of knives affixed to a vertical beam which has a circular motion on its own axis being moved by horse or other power acting on the beam A. the clay is thrown into the box and thereby these knives prepared and forced down. A polygonal figure B. (which may be of any number of sides and is a regular circular figure) is placed immediately below the box and to which by a system of cogwheels a.a.a. a rotary motion is given by the power which acts on the inclined beam A. The axis C. around which this figure revolves is fixed. an eccentric Kam D encompasses this axis and is also immoveable. This Kam is formed by the intersection of two circles the difference of whose radii is equal to the contemplated thickness of the brick to be moulded. E. F. are Kam rods which bear upon their ends b.b. the bottom of the brick mould G. H. and these kam rods are permanently attached to a yoke (called the kam yoke) c.d.e.f. which by the revolution of the polygonal figure of which the moulds occupy each a side is caused to revolve around the kam D. now when the yoke shall pass the point G. it will move on the periphery of the circle g.h.j. until it reaches the point j. when by the pressure of the Kam upon the yoke, the Kam rod E. will be pushed out of place a distance equal to the difference of the radii of the circles and the moulds will be obliged to push out the brick which will be received upon the off bearing plane I. (of which we will speak directly). The Kam rod F. being at the point G. at the same time that the Kam rod E. is at the point j. will be pulled in the same distance that E. is pushed out and will be ready to receive the clay from the upper box K. as the figure revolves the moulds passes a roller to which presses the clay by the action of a lever m. as it passes on it passes a scraper n which touches the polygon in a line of which is the projection on a vertical plane. this scraper cuts off all superfluous clay which may be attached to the moulds - another roller is passed in the revolution of the moulds which serves to conform the figure which is given to the brick - Now when the moulds reach the point at which it delivers, the brick is by the principle before described pushed out on this off bearing plane which has a motion on the rollers L equal to the velocity of the polygonal figure and which motion is imparted to the rollers by straps passing around them and around them around a circular figure attached to one extremity of and the periphery of which is equal to that of an exterior circle of the polygonal figure B. This principal may be applied by the mere pressure of a Kam represented by the dotted curve M. upon a beam o running the whole length of the moulds, or it may be applied by the use of the levers x upon which the Kam presses as before described.

The accompanying drawings 1 & 2 will give a full view of the whole in perspective and the drawing 3. will show a vertical section through the centre of the vertical beam which revolve in the box K. I have contemplated the application of the principal of this machine, to the moulding and delivery of brick as well as the casting of any other solid which by the process could be converted into a definite form. If the moulds are made of the proper material any specific form may be given to malleable metals and I flatter myself that I have invented a machine the application of the principal of which may save great labor and promote neatness in the formation of brick tile or any metal which by action of heat may be compressed into the form of such moulds as may be desirable Witnesses
H. T. Storme
Paul Perrin James Coppuck
Louisville Ky.

What I claim as my invention and not previously known, is the metalic drum or polygonal figure of moulds together with the mode of applying the kam kam spokes and rods, for the purpose of moulding and delivering brick as mentioned in the above described machine. May 18th 1836.

Witnesses
Thos J. Nelly
Sam B. Clark

James Coppock

Drawing

883 [illegible]

Exd
[illegible]